(12) United States Patent
He

(10) Patent No.: US 11,063,452 B2
(45) Date of Patent: Jul. 13, 2021

(54) PORTABLE ELECTRONIC SMOKING DEVICE WITH DUSTPROOF STRUCTURE, AND POWER SUPPLY UNIT FOR ELECTRONIC SMOKING APPARATUS

(71) Applicant: DONGGUAN MYSMOK ELECTRONIC TECHNOLOGY CO., LTD, Dongguan (CN)

(72) Inventor: Liqing He, Dongguan (CN)

(73) Assignee: DONGGUAN MYSMOK ELECTRONIC TECHNOLOGY CO., LTD., Dongguan (CN)

( * ) Notice: Subject to any disclaimer, the term of this patent is extended or adjusted under 35 U.S.C. 154(b) by 222 days.

(21) Appl. No.: 16/416,687

(22) Filed: May 20, 2019

(65) Prior Publication Data
US 2019/0273383 A1    Sep. 5, 2019

Related U.S. Application Data

(63) Continuation-in-part of application No. PCT/CN2018/090208, filed on Jun. 7, 2018.

(30) Foreign Application Priority Data

Apr. 28, 2018 (CN) .......................... 201810402948.8

(51) Int. Cl.
*H01M 10/46* (2006.01)
*H02J 7/00* (2006.01)
(Continued)

(52) U.S. Cl.
CPC .......... *H02J 7/0045* (2013.01); *A24F 40/40* (2020.01); *A24F 40/95* (2020.01); *H02J 7/0013* (2013.01); *H02J 7/0044* (2013.01)

(58) Field of Classification Search
CPC ...... H02J 7/0013; H02J 7/1423; H02J 7/0044; H02J 7/0045; H02J 7/0042; A24F 40/95; A24F 40/40
(Continued)

(56) References Cited

U.S. PATENT DOCUMENTS

| 2016/0134143 A1 | 5/2016 | Liu |
| 2016/0150824 A1* | 6/2016 | Memari ................ H02J 7/00 131/329 |

(Continued)

FOREIGN PATENT DOCUMENTS

| CN | 204232286 U | 4/2015 |
| CN | 206423567 U | 8/2017 |

(Continued)

OTHER PUBLICATIONS

Translation of WO2016197658 (Dec. 15, 2016) (Year: 2016).*

*Primary Examiner* — Edward Tso
(74) *Attorney, Agent, or Firm* — Shimokaji IP

(57) ABSTRACT

A portable electronic smoking device includes a housing, an electronic smoking apparatus, and an energy storage device. The housing is provided with at least one receiving slot for receiving the electronic smoking apparatus, the electronic smoking apparatus is mounted on a bottom wall of the receiving slot, and a part of an outer peripheral surface of the electronic smoking apparatus is covered by the receiving slot. The housing is mounted with a first magnet. The electronic smoking apparatus is received in the receiving slot when it's not in use, a part of the body of the electronic smoking apparatus is exposed, in the state where the electronic smoking apparatus is placed horizontally. Thus it's convenient to use and reachable, and it's helpful to the heat dissipation of the electronic smoking apparatus. In addition, the first magnet is configured at the bottom wall of the (Continued)

receiving slot, without worrying about the electronic smoking apparatus falling from the receiving slot.

15 Claims, 5 Drawing Sheets

(51) Int. Cl.
*A24F 40/40* (2020.01)
*A24F 40/95* (2020.01)

(58) Field of Classification Search
USPC .......................... 320/107, 108, 111, 114, 115
See application file for complete search history.

(56) References Cited

U.S. PATENT DOCUMENTS

2017/0302324 A1* 10/2017 Stanimirovic ........ H01M 50/20
2018/0198298 A1*  7/2018 Stanimirovic ........ H02J 7/0044
2019/0320716 A1* 10/2019 Seidenfeld ............ H02J 7/0044

FOREIGN PATENT DOCUMENTS

| CN | 206453241 U | 9/2017 |
| CN | 107280074 A | 10/2017 |
| CN | 206714071 U | 12/2017 |
| CN | 208434713 U | 1/2019 |
| EP | 3530130 A1 | 8/2019 |
| WO | 2014190480 A1 | 12/2014 |
| WO | 2016197658 A1 | 12/2016 |
| WO | 2019037883 A1 | 2/2019 |

* cited by examiner

PORTABLE ELECTRONIC SMOKING DEVICE WITH DUSTPROOF STRUCTURE, AND POWER SUPPLY UNIT FOR ELECTRONIC SMOKING APPARATUS

RELATED APPLICATIONS

This is a Continuation-in-Part of PCT application No. PCT/CN2018/090208, filed Jun. 7, 2018.

FIELD OF THE INVENTION

The present invention relates to a portable electronic device, and more particularly to a portable electronic smoking device, an electronic power supply unit for an electronic smoking apparatus and an electronic smoking apparatus.

BACKGROUND OF THE INVENTION

With the development of technology, electronic consumer goods are increasingly becoming personal carry-on items. For example, e-cigarettes heating E-liquid instead of burning tobacco have been popular in recent years. The main body of such an electronic smoking apparatus is generally cylindrical, which is required to be carried for smokers. Furthermore, it's required to recharge the electronic smoking apparatus frequently due to its electronic heating manner. For solving the charging problem of the electronic smoking apparatus, most of the current electronic smoking apparatus are equipped with an adapter or a charging device, which is inconvenient to carry however, to cause a potential trouble of forgetting charge and dead battery.

SUMMARY OF THE INVENTION

One objective of the present invention is to provide a portable electronic smoking device for conveniently carrying an electronic smoking apparatus and providing power for the electronic smoking apparatus.

Another objective of the present invention is to provide a power supply unit for an electronic smoking apparatus, which receives the electronic smoking apparatus and meanwhile supplies power for it.

One more objective of the present invention is to provide an electronic smoking apparatus which is easy to store and carry.

To achieve the mentioned above objectives, the present invention provides a portable electronic smoking device including a housing; an electronic smoking apparatus; and an energy storage device configured in the housing and adapted for providing working power supply or charging power supply. The housing is provided with at least one receiving slot for receiving the electronic smoking apparatus, a part of an outer peripheral surface of the electronic smoking apparatus on a section perpendicular to a longitudinal axis of the electronic smoking apparatus is covered by the receiving slot, and another part of the outer peripheral surface of the electronic smoking apparatus is exposed outside; the housing is provided with a first magnet adapted for providing an attraction force to the electronic smoking apparatus so as to stabilize the electronic smoking apparatus in the receiving slot.

In comparison with the prior art, the housing of the portable electronic smoking device is provided with at least one receiving slot for receiving electronic smoking apparatus when the electronic smoking apparatus is not in use. A part of the body of the electronic smoking apparatus is exposed, thus it's convenient to use and reachable; further it's helpful to the heat dissipation of the electronic smoking apparatus. In addition, the first magnet is configured at the bottom wall of the receiving slot, in such a way, the electronic smoking apparatus can be stabilized in the receiving slot to avoid the electronic smoking apparatus from falling from the receiving slot, and meanwhile it is convenient to carry. Furthermore, since the energy storage device is configured in the housing, thus the electronic smoking apparatus can be powered when it's placed appropriately. More conveniently, the energy storage device can also provide a charging power source for the electronic smoking apparatus, thereby avoiding the problem of dead battery when using the electronic smoking apparatus next time.

Preferably, the bottom wall of the receiving slot is provided with a recess in which the first magnet is embedded, an outer surface of the first magnet is shaped to fit with a contact surface of the electronic smoking apparatus.

Preferably, the recess is located at a middle of the bottom wall of the receiving slot.

Preferably, a thermal insulation structure is configured between the bottom wall of the receiving slot and the energy storage device.

Preferably, the thermal insulation structure comprises a gap formed between the bottom wall of the receiving slot and the energy storage device, and a reinforcing rib connected between the bottom wall of the receiving slot and the energy storage device.

Preferably, the housing is further provided with a power outlet configured at the bottom wall of the receiving slot.

Preferably, two receiving slots are included, and the two receiving slots are arranged oppositely at two sides of the housing.

Preferably, a second magnet is embedded in the electronic smoking apparatus, when the electronic smoking apparatus is closed to the receiving slot, the electronic smoking apparatus is attracted and stabilized in the receiving slot due to an interaction force between the first magnet and the second magnet.

The present invention further provides a power supply unit for an electronic smoking apparatus comprising a housing in which an energy storage device is configured so as to supply power, wherein the housing is provided with at least one receiving slot, and a first magnet is embedded in a bottom wall of the receiving slot.

Preferably, the bottom wall of the receiving slot is provided with a recess in which the first magnet is embedded.

Preferably, the recess is located at a middle of the bottom wall of the receiving slot.

Preferably, a thermal insulation structure is configured between the bottom wall of the receiving slot and the energy storage device.

Preferably, the thermal insulation structure comprises a gap formed between the bottom wall of the receiving slot and the energy storage device, and a reinforcing rib connected between the bottom wall of the receiving slot and the energy storage device.

Preferably, two receiving slots are included, and the two receiving slots are arranged oppositely at two sides of the housing.

Preferably, the housing is further provided with a power outlet configured at the bottom wall of the receiving slot.

In addition, the present invention further provides an electronic smoking apparatus, adapted for receiving a tobacco product, wherein a housing of the electronic smoking apparatus is embedded with a second magnet.

Preferably, the housing of the electronic smoking apparatus is provided with a cavity for receiving a power supply, the second magnet is embedded in the cavity, and an outer wall of the second magnet is aligned with an outer wall of the cavity.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The present invention will be described in detail below with reference to the accompanying drawings and preferred embodiments.

Figure 1:
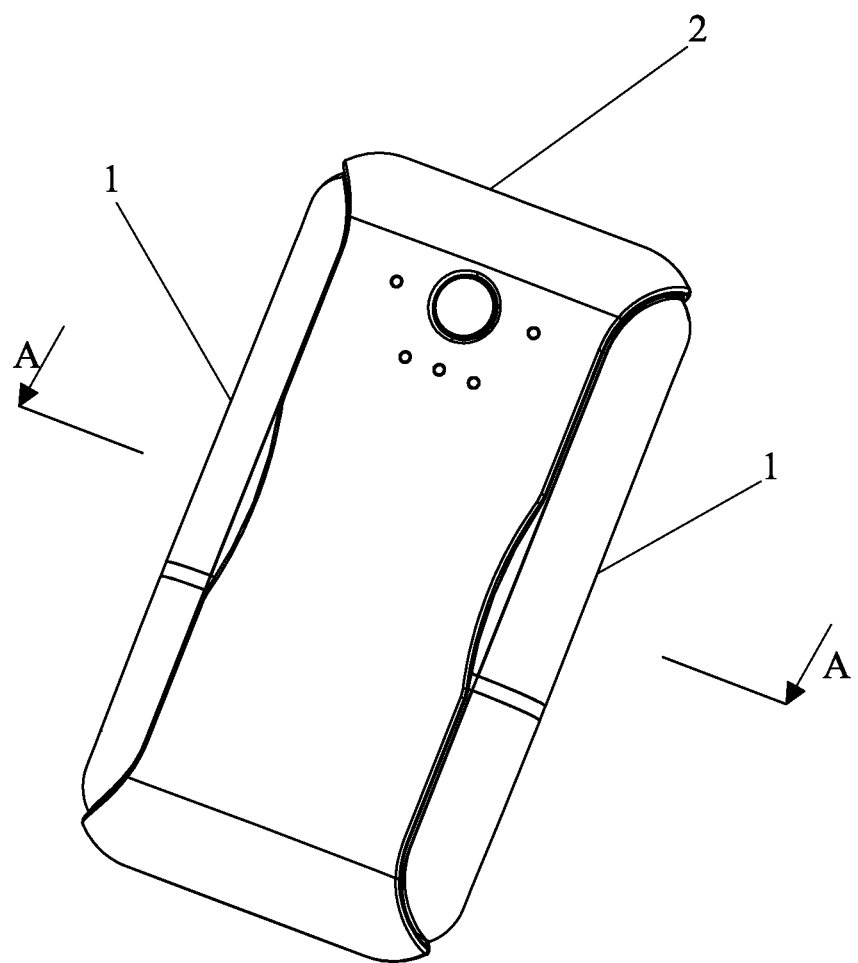
FIG. 1 is a perspective view of a portable electronic smoking device according to an embodiment of the present invention.
Figure 2:
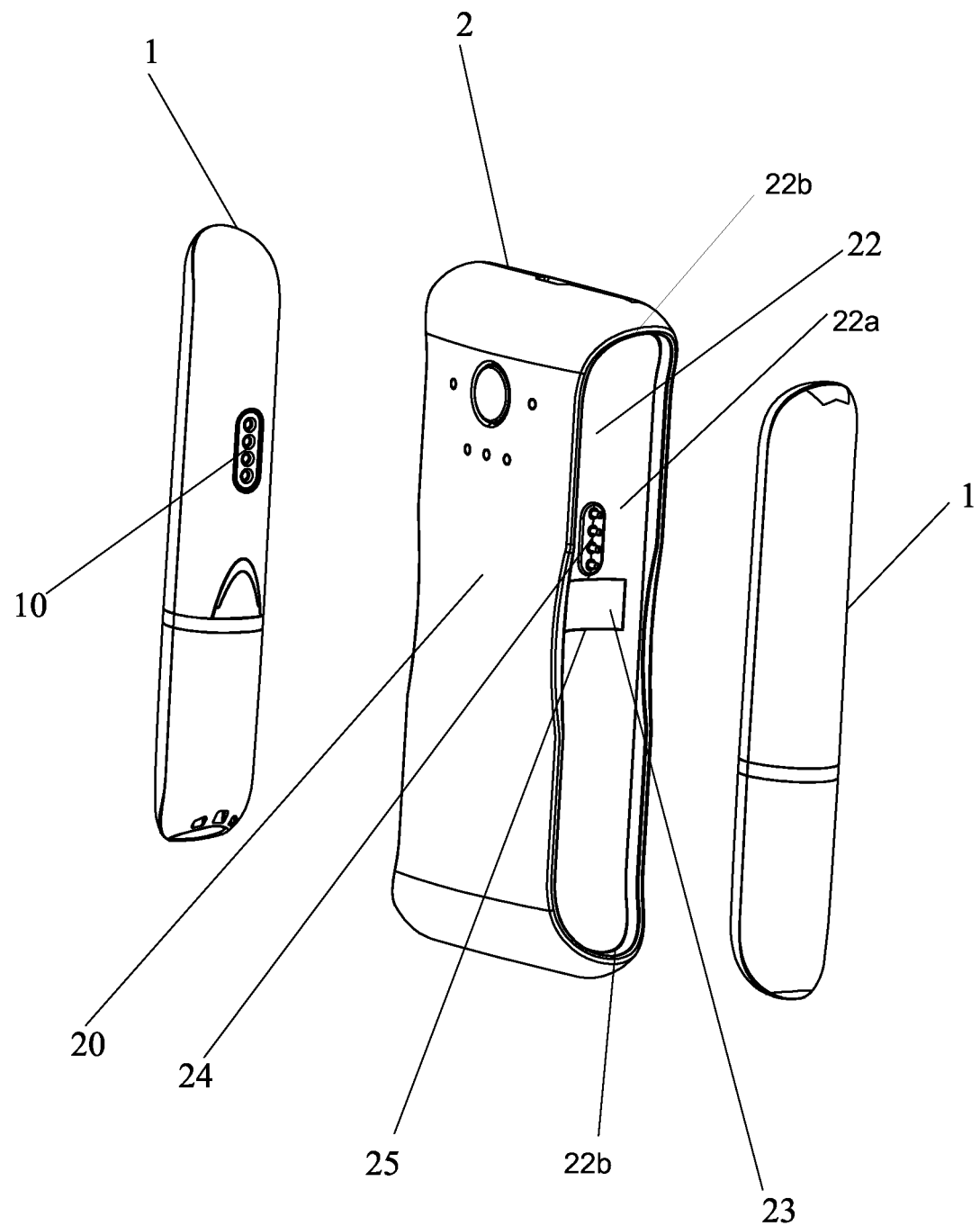
FIG. 2 is an exploded view of the portable electronic smoking device according to an embodiment of the present invention.
Figure 3:
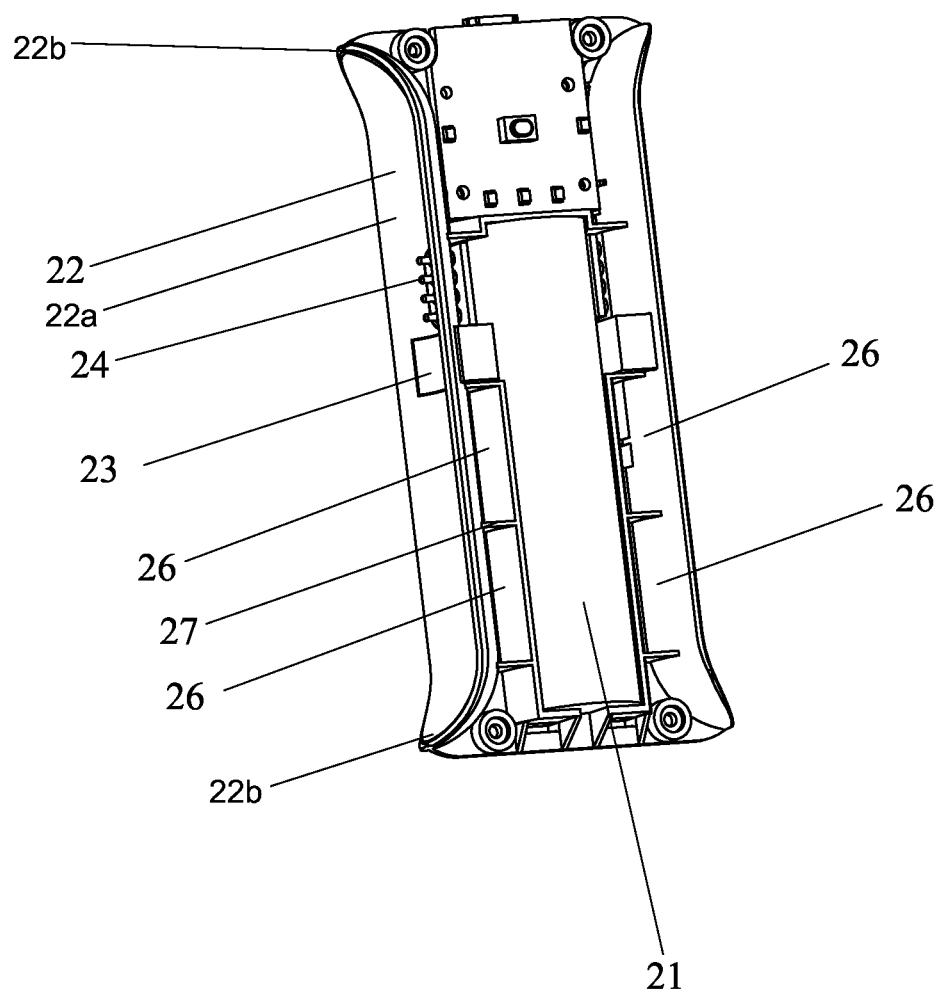
FIG. 3 is a schematic view of the power supply unit for an electronic smoking apparatus according to an embodiment of the present invention showing its internal structure.
Figure 4:
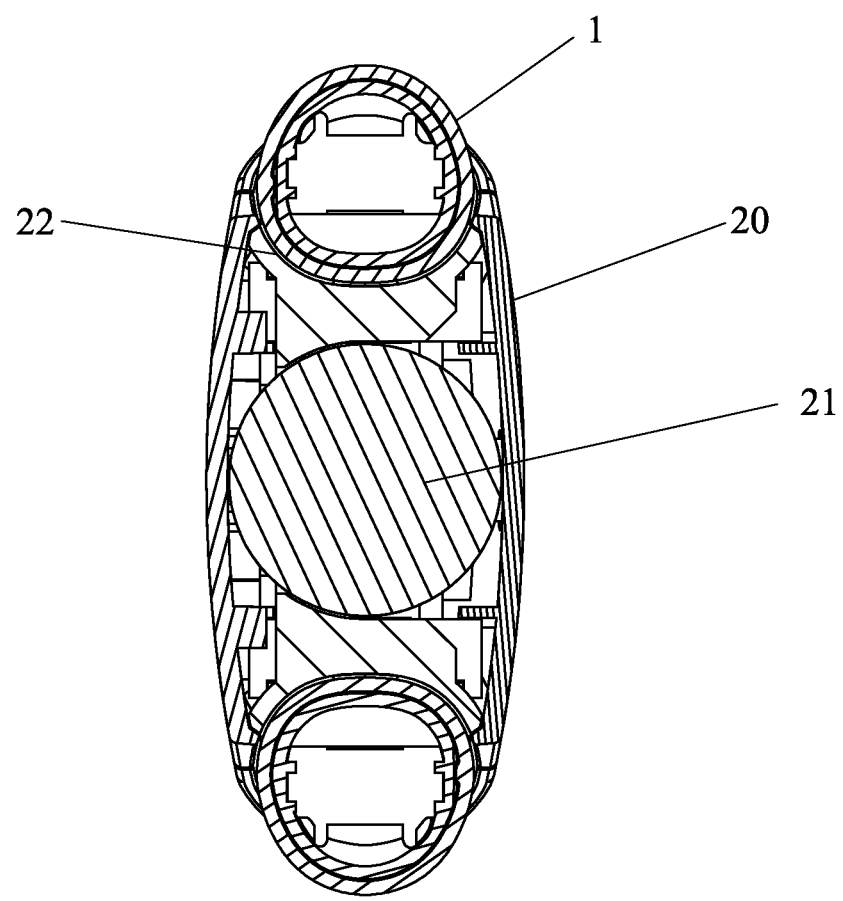
FIG. 4 is a sectional view of the portable electronic smoking device of FIG. 1 along the A-A line.

As illustrated in FIGS. 1-3, a portable electronic smoking device 100 according to the present invention includes an electronic smoking apparatus 1 for receiving tobacco products and an electronic smoking apparatus power supply device 2 for matching with and supplying working power supply or charging power supply the electronic smoking apparatus 1. Specifically the electronic smoking apparatus power supply device 2 includes a housing 20 and an energy storage device 21 configured in the housing 20 and adapted for providing working power supply or charging power supply to the electronic smoking apparatus 1. The housing 20 is provided with at least one receiving slot 22 for receiving the electronic smoking apparatus 1, the electronic smoking apparatus 1 is mounted on a bottom wall 22a of the receiving slot 22, and the receiving slot 22 only covers a part of an outer peripheral surface of the electronic smoking apparatus 1 on a section perpendicular to a longitudinal axis of the electronic smoking apparatus 1. That is, a part of the outer peripheral surface of the electronic smoking apparatus 1 is exposed outside. The bottom wall 22a of the receiving slot 22 is provided with a recess 25 in which a first magnet 23 is embedded, an outer surface of the first magnet 23 is shaped to fit with a contact surface of the electronic smoking apparatus 1, the first magnet 23 is adapted for proving an attraction force to the electronic smoking apparatus 1 so as to stabilize the electronic smoking apparatus 1 in the receiving slot 22. Of course, the first magnet 23 can be mounted on other suitable positions of the housing 20. Specifically, as shown in FIGS. 2 and 3, the receiving slot 22 has two side walls 22b extended from the bottom wall 22a to form two flanges so as to cover two ends of the electronic smoking apparatus 1, in order to prevent dust from entering into the electronic smoking apparatus 1.

On a section perpendicular to a longitudinal axis of the electronic smoking apparatus 1, because a partial peripheral surface of the electronic smoking apparatus 1 is covered by the receiving slot 22, when the electronic smoking apparatus 1 is placed in the receiving slot 22, a part of the body of the electronic smoking apparatus 1 is exposed outside, thus it's convenient to use, further it's helpful to the heat dissipation of the electronic smoking apparatus 1. In addition, the first magnet 23 is configured at the bottom of the receiving slot 22, in such a way, the electronic smoking apparatus 1 can be stabilized in the receiving slot 22 to avoid the electronic smoking apparatus 1 from falling from the receiving slot 22, and meanwhile it is convenient to carry. Furthermore, since the energy storage device 21 configured in the housing 20, thus the electronic smoking apparatus 1 can be powered when it's placed appropriately. More conveniently, the energy storage device 21 can also provide a charging power source for the electronic smoking apparatus 1, and the portable power source providing device 2 also provides a charging function while accommodating the electronic smoking apparatus 1, thereby avoiding the problem of dead battery when using the electronic smoking apparatus 1 next time. Preferably, two receiving slots 22 are oppositely arranged at the housing 20, such that, each receiving slot 22 can accommodate one electronic smoking apparatus 1. The two electronic smoking apparatus 1 can be used alternately. In this embodiment, the energy storage device 21 is a rechargeable battery, and a recharging interface is configured on the housing 20. Of course, other energy storage devices such as bulk capacitors also can be used.

Figure 5:
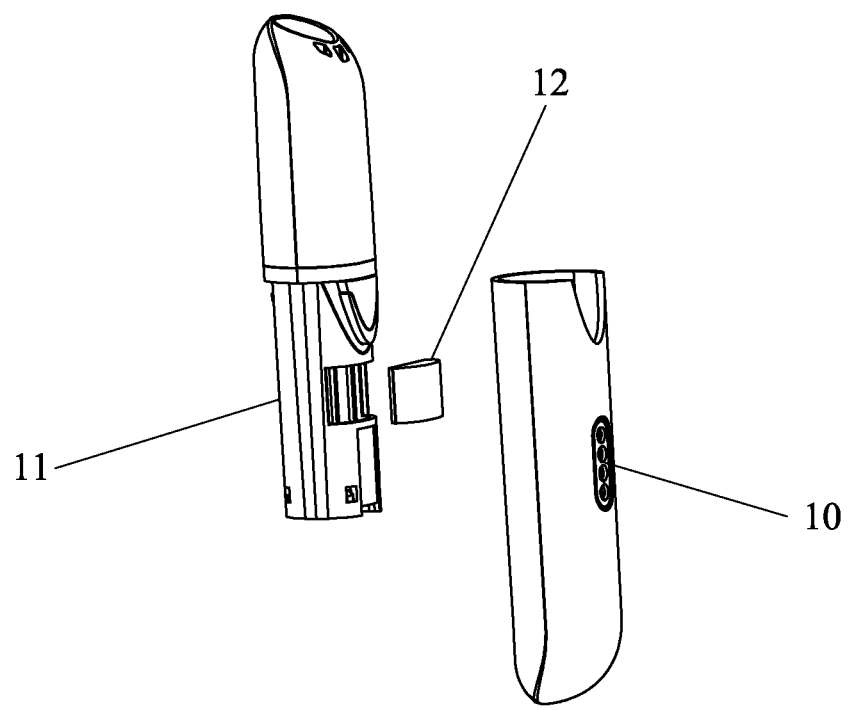
FIG. 5 is an exploded view of the electronic smoking apparatus according to an embodiment of the present invention.

In order to ensure the magnetic force provided by the first magnet 23 for the electronic smoking apparatus 1 to act on the center of gravity of the electronic smoking apparatus 1, the first magnet 23 is configured at the middle position of the bottom of the receiving slot 22 in this embodiment, in such a way, the electronic smoking apparatus 1 is balanced and located in the receiving slot 22. Meanwhile, the second magnet 12 is configured at the corresponding position of the electronic smoking apparatus 1, thus when the electronic smoking apparatus 1 is close to the receiving slot 22, the electronic smoking apparatus 1 will be attracted into the receiving slot 22 and then placed steadily due to the interaction attraction between the first magnet 23 and the second magnet 12. Preferably, as shown in FIG. 5, the housing 1 of the electronic smoking apparatus 1 is provided with a cavity 11 to accommodate the power supply, the second magnet 12 is embedded in the cavity 11, and the outer wall of the second magnet 12 is aligned with the outer wall of the cavity 11.

In order to facilitate charging the electronic smoking apparatus 1, the housing 20 is provided with a power outlet for electrically connected with the energy storage device 21, furthermore, the power outlet is configured at the bottom wall 22a of the receiving slot 22. In this embodiment, the power outlet is a charging pin 24, and the electronic smoking apparatus 1 is provided with a corresponding charging hole 10. In such a way, when the electronic smoking apparatus 1 is placed in the receiving slot 22, the charging pin 24 is inserted into the charging hole 10 to connect the charging circuit, so as to charge the smoking apparatus 1.

While charging, large heat energy will be generated in the energy storage device 21, and meanwhile heat also will be generated in the power supply of the electronic smoking apparatus 1. If the heat energy of the energy storage device 21 is transferred to the power supply, the temperature of the electronic smoking apparatus 1 will be increased to weaken the power supply to reduce the lifetime accordingly. For solving this problem, a thermal insulation structure is configured between the bottom wall 22a of the receiving slot 22 and the energy storage device 21, in this embodiment; preferably, the thermal insulation structure includes a gap 26 formed between the bottom wall of the receiving slot 22 and the energy storage device 21, and a reinforcing rib 27 connected between the bottom wall 22a of the receiving slot 22 and the energy storage device 21.

The above is only the preferred embodiment of the present application, and the scope of the application is not limited thereto, and thus equivalent changes made by the scope of the present application are still within the scope of the present application.

What is claimed is:

1. A portable electronic smoking device, comprising:
a housing;
an electronic smoking apparatus having two ends; and
an energy storage device configured in the housing and adapted for providing working power supply or charging power supply;
wherein the housing is provided with at least one receiving slot for receiving the electronic smoking apparatus, the receiving slot has a bottom wall on which the electronic smoking apparatus is mounted, and two side walls extended from the bottom wall to form two flanges so as to cover the two ends of the electronic smoking apparatus, a part of an outer peripheral surface of the electronic smoking apparatus on a section perpendicular to a longitudinal axis of the electronic smoking apparatus is covered by the receiving slot, and another part of the outer peripheral surface of the electronic smoking apparatus is exposed outside;
the housing is provided with a first magnet adapted for providing an attraction force to the electronic smoking apparatus so as to stabilize the electronic smoking apparatus in the receiving slot.

2. The portable electronic smoking device according to the claim 1, wherein the bottom wall of the receiving slot is provided with a recess in which the first magnet is embedded, an outer surface of the first magnet is shaped to fit with a contact surface of the electronic smoking apparatus.

3. The portable electronic smoking device according to the claim 2, wherein the recess is located at a middle of the bottom wall of the receiving slot.

4. The portable electronic smoking device according to the claim 1, wherein a thermal insulation structure is configured between the bottom wall of the receiving slot and the energy storage device.

5. The portable electronic smoking device according to the claim 4, wherein the thermal insulation structure comprises a gap formed between the bottom wall of the receiving slot and the energy storage device, and a reinforcing rib connected between the bottom wall of the receiving slot and the energy storage device.

6. The portable electronic smoking device according to the claim 1, wherein the housing is further provided with a power outlet configured at the bottom wall of the receiving slot.

7. The portable electronic smoking device according to the claim 1, wherein two receiving slots are included, and the two receiving slots are arranged oppositely at two sides of the housing.

8. The portable electronic smoking device according to the claim 1, wherein a second magnet is embedded in the electronic smoking apparatus, when the electronic smoking apparatus is closed to the receiving slot, the electronic smoking apparatus is attracted and stabilized in the receiving slot due to an interaction force between the first magnet and the second magnet.

9. A power supply unit for an electronic smoking apparatus, comprising a housing in which an energy storage device is configured so as to supply power, wherein the housing is provided with at least one receiving slot, the receiving slot has a bottom wall on which the electronic smoking apparatus is mounted, and two side walls extended from the bottom wall to form two flanges so as to cover two ends of the electronic smoking apparatus, and a first magnet is embedded in the bottom wall of the receiving slot.

10. The power supply unit according to the claim 9, wherein the bottom wall of the receiving slot is provided with a recess in which the first magnet is embedded.

11. The power supply unit according to the claim 10, wherein the recess is located at a middle of the bottom wall of the receiving slot.

12. The power supply unit according to the claim 9, wherein a thermal insulation structure is configured between the bottom wall of the receiving slot and the energy storage device.

13. The power supply unit according to the claim 12, wherein the thermal insulation structure comprises a gap formed between the bottom wall of the receiving slot and the energy storage device, and a reinforcing rib connected between the bottom wall of the receiving slot and the energy storage device.

14. The power supply unit according to the claim 9, wherein two receiving slots are included, and the two receiving slots are arranged oppositely at two sides of the housing.

15. The power supply unit according to the claim 9, wherein the housing is further provided with a power outlet configured at the bottom wall of the receiving slot.

* * * * *